US012606014B2

(12) United States Patent
Dudar

(10) Patent No.: US 12,606,014 B2
(45) Date of Patent: Apr. 21, 2026

(54) METHODS AND SYSTEMS FOR A PRESSURELESS FUEL TANK

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 149 days.

(21) Appl. No.: 17/645,226

(22) Filed: Dec. 20, 2021

(65) Prior Publication Data

US 2023/0191902 A1 Jun. 22, 2023

(51) Int. Cl.
*B60K 15/035* (2006.01)

(52) U.S. Cl.
CPC .... *B60K 15/035* (2013.01); *B60K 2015/0358* (2013.01)

(58) Field of Classification Search
CPC .......... B60K 15/035; B60K 2015/0358; B60K 15/03504; B65D 88/62
See application file for complete search history.

(56) References Cited

U.S. PATENT DOCUMENTS

| | | | | | |
|---|---|---|---|---|---|
| 2,859,808 | A | * | 11/1958 | Youngquist | ............. F02K 9/605 |
| | | | | | 222/386.5 |
| 3,617,034 | A | * | 11/1971 | Skinner | ............ B60K 15/03504 |
| | | | | | 123/518 |
| 3,693,825 | A | * | 9/1972 | Richman | .......... B60K 15/03504 |
| | | | | | 220/227 |

| | | | | | |
|---|---|---|---|---|---|
| 4,880,135 | A | * | 11/1989 | Neou | ...................... B65D 90/38 |
| | | | | | 220/721 |
| 5,722,374 | A | * | 3/1998 | Kidokoro | ............. B60K 15/035 |
| | | | | | 123/518 |
| 5,975,331 | A | * | 11/1999 | Ishikawa | ................ B60K 15/03 |
| | | | | | 220/564 |

(Continued)

FOREIGN PATENT DOCUMENTS

| | | |
|---|---|---|
| JP | 3790017 B2 | 6/2006 |
| JP | 5373459 B2 | 12/2013 |

OTHER PUBLICATIONS

Ford in the News, "C-MAX Energi Posts Maximum Electric-Only Top Speed," Wayback Machine Internet Archive Website, Available Online at https://web.archive.org/web/20121012012830/FORDINTHENEWS.COM/c-max-energi-posts-maximum-electric-only-top-speed, Aug. 10, 2012, Achieved Oct. 18, 2012, 3 pages.

*Primary Examiner* — Logan M Kraft
*Assistant Examiner* — Joshua Campbell
(74) *Attorney, Agent, or Firm* — McCoy Russell LLP

(57) ABSTRACT

Methods and systems are provided for performing a reverse purge of an evaporative emissions canister in a vehicle with a sealed variable volume fuel tank. In one example, a method may comprise in response to an ambient temperature reducing during a diurnal temperature cycle, and further in response to the EVAP canister loaded with fuel vapors above a threshold, closing a valve positioned at an atmospheric port of the fuel tank and opening a fuel tank isolation valve. In one example, the fuel tank isolation valve may be in fluid communication between the fuel tank and the EVAP canister. In this way, it is possible to convert a sealed variable volume fuel tank to a vented pressurized fuel tank and initiate a reverse purge during the cooldown hours of the diurnal temperature cycle.

16 Claims, 4 Drawing Sheets

(56) References Cited

U.S. PATENT DOCUMENTS

| | | | | |
|---|---|---|---|---|
| 6,260,544 B1 * | 7/2001 | Spry | ................ | B60K 15/03504 |
| | | | | 220/721 |
| 6,318,398 B1 * | 11/2001 | Ehrman | ........... | B60K 15/03504 |
| | | | | 123/519 |
| 6,412,476 B1 * | 7/2002 | Thompson | ......... | F02M 37/0082 |
| | | | | 138/31 |
| 6,446,614 B1 * | 9/2002 | Matsuoka | ............... | F02D 29/06 |
| | | | | 123/519 |
| 6,681,789 B1 * | 1/2004 | Moulis | .................... | F16K 24/04 |
| | | | | 220/88.3 |
| 9,050,885 B1 * | 6/2015 | Dudar | .................... | B60K 15/03 |
| 9,211,792 B2 * | 12/2015 | Balloul | ............. | F02M 37/0088 |
| 9,488,136 B2 | 11/2016 | Pearce et al. | | |
| 2002/0036204 A1 * | 3/2002 | Miura | ............. | B60K 15/03519 |
| | | | | 220/562 |
| 2006/0011173 A1 * | 1/2006 | Davis | .............. | B60K 15/03177 |
| | | | | 220/749 |
| 2014/0216421 A1 * | 8/2014 | Pifher | ................ | F02M 25/0854 |
| | | | | 123/520 |
| 2015/0158377 A1 * | 6/2015 | Dudar | ................. | B60K 11/085 |
| | | | | 903/904 |
| 2017/0356393 A1 * | 12/2017 | Dudar | ............... | F02M 25/0809 |
| 2019/0249622 A1 * | 8/2019 | Dudar | ............. | B60K 15/03504 |
| 2020/0369508 A1 * | 11/2020 | Dudar | ............. | B60K 15/03504 |

* cited by examiner

METHODS AND SYSTEMS FOR A PRESSURELESS FUEL TANK

FIELD

The present description relates generally to methods and systems for a pressureless fuel tank of a vehicle, and particularly reverse purging an evaporative emissions canister included therein.

BACKGROUND/SUMMARY

Vehicles, such as plug-in hybrid electric vehicles (PHEVs), may include a fuel system in which a fuel tank may be fluidically coupled to an evaporative emissions (EVAP) canister for storing, filtering, and venting fuel vapors from the fuel tank. The fuel tank may be isolatable from the EVAP canister via a fuel tank isolation valve (FTIV) such that only fuel vapors from select events may be present in a given volume (e.g., the fuel tank or the EVAP canister). For example, the fuel tank may trap diurnal fuel vapors (that is, from diurnal temperature cycles) and "running loss" fuel vapors (that is, from fuel vaporized during vehicle operation), and the EVAP canister may adsorb depressurization fuel vapors (that is, fuel vapors depressurized from the fuel tank to reduce overpressure) and refueling fuel vapors (that is, fuel vapors diverted during refilling of the fuel tank). Further, when a pressure gradient is generated due to a relatively low pressure in either an intake manifold of the vehicle or the fuel tank, fuel vapors may be passively purged from the EVAP canister.

Such fuel systems are sometimes referred to as non-integrated refueling canister-only systems (NIRCOSs). To control the various venting and flow paths for the fuel vapors during different modes of vehicle operation, actuation of complex valve and locking systems (including the FTIV) may be enabled such that no single volume in the NIRCOS is overwhelmed with excess fuel vapor pressure and that any such excess fuel vapor pressure is released. To ensure component reliability in extreme fuel vapor pressure scenarios (e.g., excess fuel vapor pressure or excess vacuum), components of the fuel system may be specially reinforced. For example, the fuel tank may be constructed from heavy steel and may include a number of standoffs supporting opposing walls of the fuel tank. To further mitigate component degradation, depressurization or venting of the fuel tank and/or the EVAP canister may be executed on a timescale ranging from a few seconds to a few minutes (e.g., depending on ambient conditions).

However, particularly lengthy depressurization/venting may result in operator frustration or confusion, as the excess fuel vapor pressure needs to be evacuated prior to opening a refueling inlet to the atmosphere. Additionally, the extra hardware used to seal and depressurize the fuel tank adds cost to the system. One approach to reducing the depressurization time and cost is to use a sealed but "pressure-less" fuel tank with a built-in variable volume device (e.g., a bellows) that expands and contracts to relieve vacuum and pressure buildups, thereby eliminating pressurization hardware and reducing costs as shown in U.S. Pat. Nos. 6,681,789; 3,693,825; and J.P. Patent No. 3,790,017.

However, the inventors herein have recognized potential issues with such systems. For instance, NIRCOS (e.g., fixed-volume) fuel tanks may generate a vacuum during the cooldown hours of the diurnal cycle. As fuel in the tank cools and condenses, fresh air may be pulled into the EVAP canister from the fresh air port. The fresh air flow purges the canister of stored fuel vapor, reducing the likelihood of hydrocarbons escaping to atmosphere. This advantageous phenomenon of fixed-volume fuel tanks, sometimes called "reverse purging," enables a reduction in the size of the EVAP canister and occurs naturally, typically overnight, as ambient temperature falls and the vehicle is not in use. However, in a pressure-less (e.g., sealed variable volume) fuel tank, bellows expand and contract to minimize pressure generation in the tank, such as pressure vacuum generation due to ambient cooling. Therefore, a reverse purge may not occur in a sealed variable volume fuel tank.

In one example, the issues described above may be addressed by a method to perform a reverse purge of an evaporative emissions canister in a vehicle with a sealed variable volume fuel tank. In one example, the method may include in response to an ambient temperature reducing during a diurnal temperature cycle, and further in response to a loading of the evaporative emissions canister with vapors above a threshold, closing a valve positioned at an atmospheric port of the fuel tank. In this way, a sealed variable volume fuel tank may be converted to a fixed-volume fuel tank during the cool down hours of a diurnal temperature cycle, enabling a vacuum-induced reverse purge of an EVAP canister.

In another example, the method may include opening a fuel tank isolation valve, the fuel tank isolation valve being in fluid communication between the fuel tank and the EVAP canister. In one example, the valve may be coupled between an internal volume of bellows in the sealed variable volume fuel tank and the atmospheric port. In one example, ambient temperature reducing during a diurnal temperature cycle may be determined based on predicted weather conditions. The method may further include the closing of the valve during a vehicle off condition. In this way, an advantage of NIRCOS systems may be adapted to variable volume systems, thus easing a transition from pressurized fuel tank systems to pressure-less fuel tank systems.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
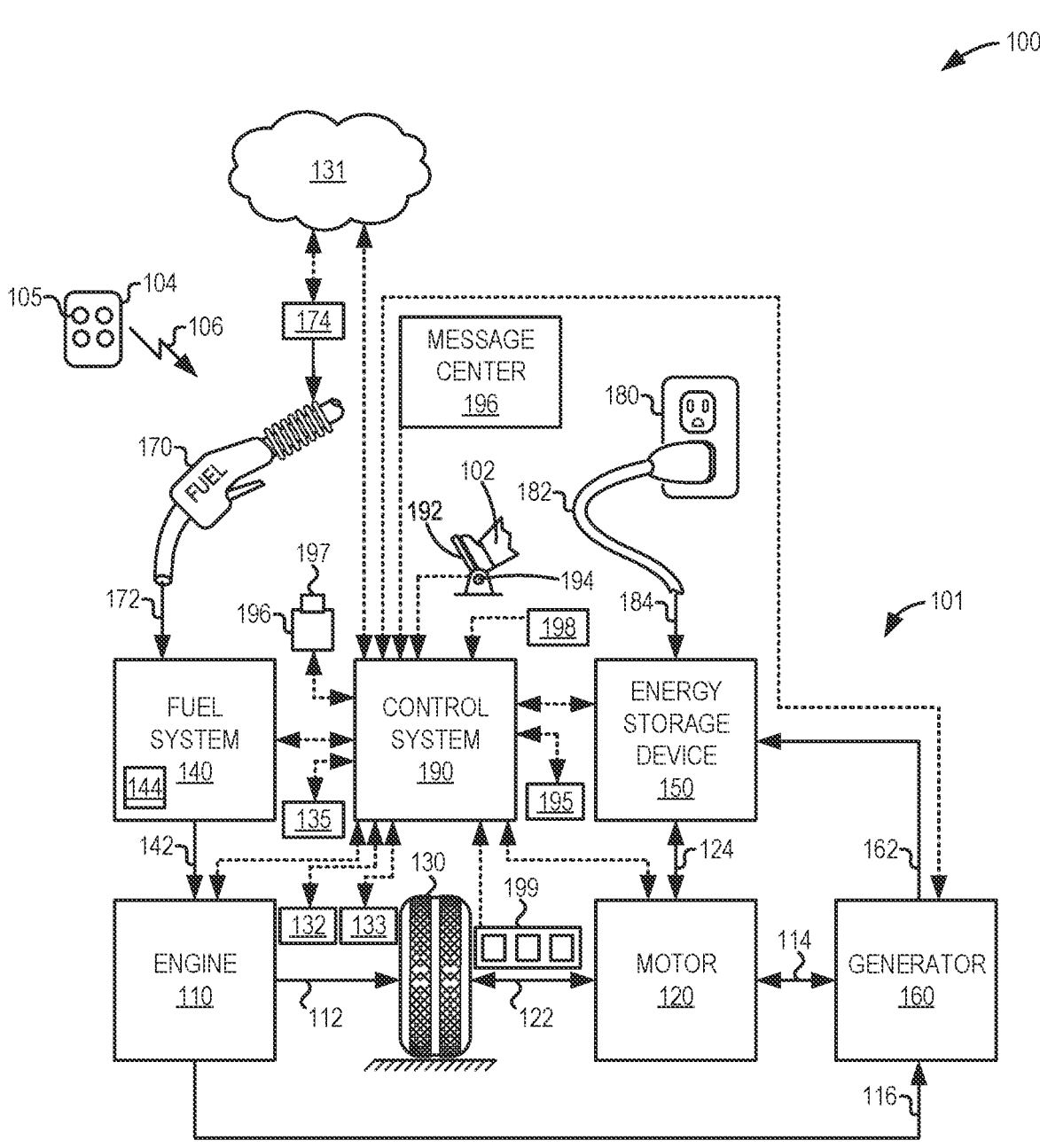
FIG. 1 shows a high-level block diagram illustrating an example vehicle system.
Figure 2:
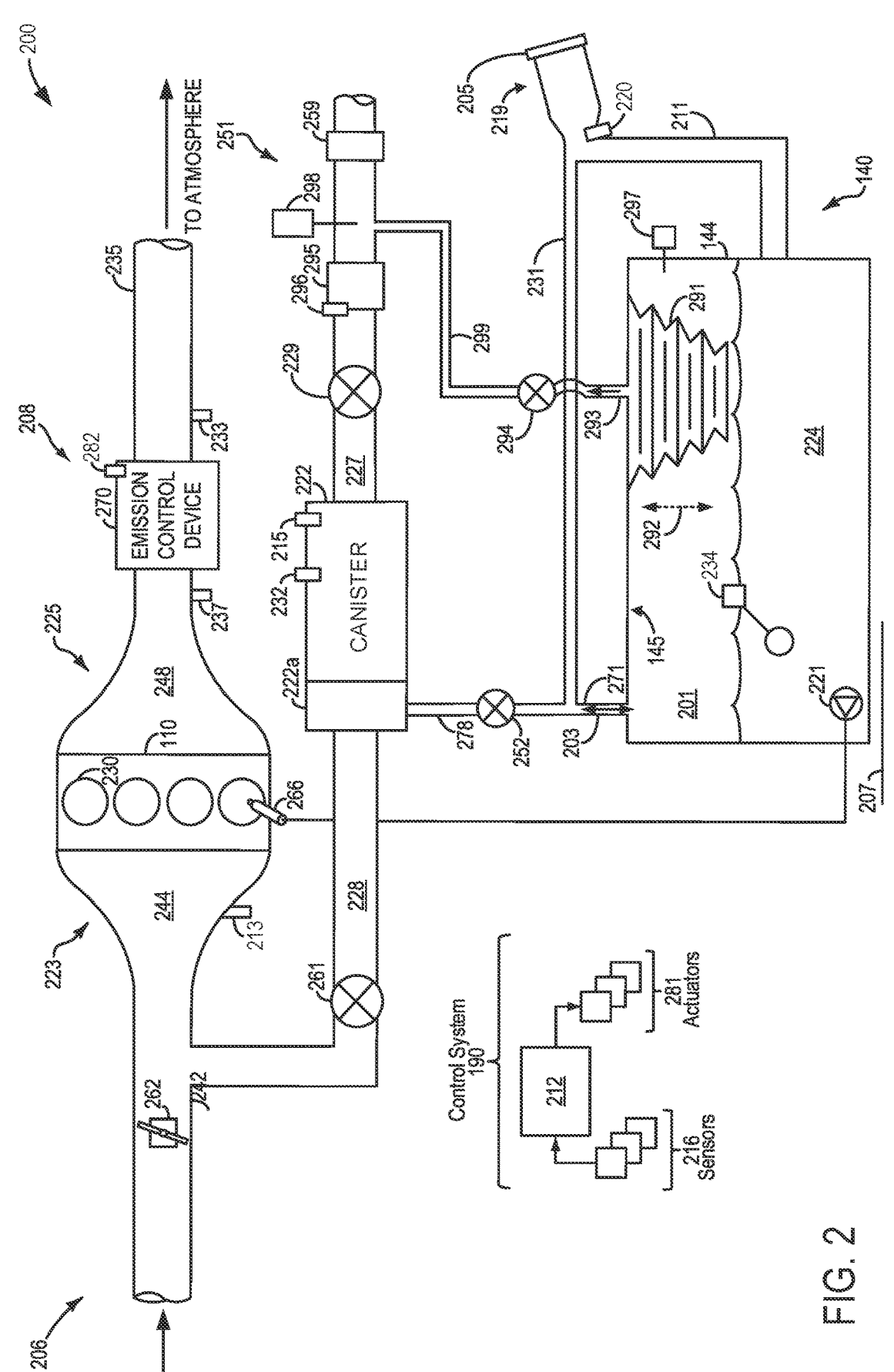
FIG. 2 shows a schematic diagram of a portion of the example vehicle system of FIG. 1, the portion of the example vehicle system including a fuel system and an evaporative emissions control system.

The following description relates to methods and systems for performing a reverse purge of an evaporative emissions canister of an evaporative emissions control system coupled to an engine including a sealed variable volume fuel tank (e.g., a pressure-less fuel tank), such as the evaporative emissions system and the engine included in the vehicle system of FIGS. 1 and 2. A control routine may be implemented by a controller included in the vehicle system, the controller configured to perform a series of actions to initiate a reverse purge of the EVAP canister of based on a time of day indicating cooler hours of a diurnal cycle and a loading state of the EVAP canister. In one example, the control routine may include sealing a valve of an atmospheric pressure port of a bellows of a variable volume fuel tank and, simultaneously, opening a fuel tank isolation valve of the fuel tank. The controller may also be configured to stop the reverse purge and restore default venting based on a detection of one or more conditions, such as engine start up and/or a time of day indicating warmer hours of the diurnal cycle. As one example, the control routine may include a method depicted in FIG. 3 for performing a reverse purge of an EVAP canister of the evaporative emissions control system. In this way, sealed variable volume fuel tanks used in hybrid vehicles may be intermittently converted to vented fixed-volume fuel tanks, enabling reverse purging of the EVAP canister and reducing evaporative emissions.

Referring now to FIG. 1, a high-level block diagram 100 depicting an example vehicle propulsion system 101 is shown. Vehicle propulsion system 101 includes an engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. In such an example, a vehicle with vehicle propulsion system 101 may be referred to as a hybrid electric vehicle (HEV).

Vehicle propulsion system 101 may utilize a variety of different operational modes depending on operating conditions encountered by the vehicle propulsion system. Some of these modes may enable engine 110 to be maintained in an off state (e.g., set to a deactivated state) where combustion of fuel at the engine is discontinued. For example, under select operating conditions, motor 120 may propel the vehicle via one or more drive wheels 130 (as indicated by an arrow 122) while engine 110 is deactivated.

During other operating conditions, engine 110 may be set to a deactivated state (as described above) while motor 120 may be operated to charge an energy storage device 150. For example, motor 120 may receive wheel torque from drive wheel(s) 130 (as indicated by arrow 122), where the motor may convert the kinetic energy of the vehicle to electrical energy for storage at an energy storage device 150 (as indicated by an arrow 124). This operation may be referred to as regenerative braking of the vehicle. Thus, motor 120 can provide a generator function in some examples. However, in other examples, a generator 160 may instead receive wheel torque from drive wheel(s) 130, where the generator may convert the kinetic energy of the vehicle to electrical energy for storage at energy storage device 150 (as indicated by an arrow 162).

During still other operating conditions, engine 110 may be operated by combusting fuel received from a fuel system 140 (as indicated by an arrow 142). For example, engine 110 may be operated to propel the vehicle via drive wheel(s) 130 (as indicated by an arrow 112) while motor 120 is deactivated. During other operating conditions, both engine 110 and motor 120 may each be operated to propel the vehicle via drive wheel(s) 130 (as indicated by arrows 112, 122, respectively). A configuration where both engine 110 and motor 120 may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle propulsion system 101 may be configured as a series type vehicle propulsion system, whereby engine 110 does not directly propel drive wheel(s) 130. Rather, engine 110 may be operated to power motor 120, which may in turn propel the vehicle via drive wheel(s) 130 (as indicated by arrow 122). For example, during select operating conditions, engine 110 may drive generator 160 (as indicated by an arrow 116), which may in turn supply electrical energy to one or more of motor 120 (as indicated by an arrow 114) and energy storage device 150 (as indicated by arrow 162). As another example, engine 110 may be operated to drive motor 120, which may in turn provide a generator function to convert engine output to electrical energy, where the electrical energy may be stored at energy storage device 150 for later use by motor 120.

Fuel system 140 may include one or more fuel tank(s) 144 for storing fuel onboard the vehicle. For example, fuel tank 144 may store one or more liquid fuels, including but not limited to gasoline, diesel, and alcohol fuels. In some examples, the fuel may be stored onboard the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 (as indicated by arrow 142). Still other suitable fuels or fuel blends may be supplied to engine 110, where they may be combusted at engine 110 to produce the engine output. The engine output may be utilized to propel the vehicle (e.g., via drive wheel(s) 130, as indicated by arrow 112) or to recharge energy storage device 150 via motor 120 or generator 160. The fuel tank 144 may be a sealed variable volume fuel tank, with bellows providing the variable volume. The fuel tank is sealed except for only a fuel tank isolation valve port and a fuel filler pipe (e.g., a neck) as described herein.

In some examples, energy storage device 150 may be configured to store electrical energy that may be supplied to other electrical loads residing onboard the vehicle (other than motor 120), including cabin heating and air conditioning, engine starting, headlights, cabin audio and video systems, etc. As a non-limiting example, energy storage device 150 may include one or more batteries and/or capacitors.

A control system 190 may communicate at least with one or more of engine 110, motor 120, fuel system 140, energy storage device 150, and generator 160. Specifically, control system 190 may receive sensory feedback information at least from one or more of engine 110, motor 120, fuel system 140, energy storage device 150, and generator 160. Further, control system 190 may send control signals at least to one or more of engine 110, motor 120, fuel system 140, energy storage device 150, and generator 160 responsive to the sensory feedback information. Control system 190 may receive an indication of an operator requested output of vehicle propulsion system 101 from a vehicle operator 102. For example, control system 190 may receive sensory feedback from a pedal position sensor 194, which communicates with a pedal 192. Pedal 192 may refer schematically to a brake pedal and/or an accelerator pedal. Furthermore, in some examples, control system 190 may be in communication with a remote engine start receiver 195 (or transceiver) that receives wireless signals 106 from a key fob 104 having a remote start button 105. In other examples (not shown), a remote engine start may be initiated via a cellular telephone or smartphone based system where a cellular telephone or smartphone (e.g., operated by vehicle operator 102) may send data to a server and the server may communicate with the vehicle (e.g., via a wireless network 131) to start engine 110.

Energy storage device 150 may periodically receive electrical energy from a power source 180 residing external to the vehicle, e.g., not part of the vehicle (as indicated by an arrow 184). As a non-limiting example, vehicle propulsion system 101 may be configured as a plug-in HEV (PHEV), whereby electrical energy may be supplied to energy storage device 150 from power source 180 via an electrical energy transmission cable 182. During a recharging operation of energy storage device 150 from power source 180, electrical energy transmission cable 182 may electrically couple energy storage device 150 to power source 180. When vehicle propulsion system 101 is subsequently operated to propel the vehicle, electrical energy transmission cable 182 may be disconnected between power source 180 and energy storage device 150. Control system 190 may identify and/or control an amount of electrical energy stored at energy storage device 150, which may be referred to as a state of charge (SOC).

In other examples, electrical energy transmission cable 182 may be omitted, and electrical energy may instead be received wirelessly at energy storage device 150 from power source 180. For example, energy storage device 150 may receive electrical energy from power source 180 via one or more of electromagnetic induction, radio waves, and electromagnetic resonance. More broadly, any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle (e.g., during a refueling event). As a non-limiting example, vehicle propulsion system 101 may be refueled by receiving fuel via a fuel dispensing device 170 (as indicated by an arrow 172), the fuel dispensing device being supplied with fuel by an external fuel pump 174. In some examples, fuel tank 144 may be configured to store the fuel received from fuel dispensing device 170 until the fuel is supplied to engine 110 for combustion. In some examples, control system 190 may receive an indication of a level of the fuel stored at fuel tank 144 (also referred to herein as the fuel level or fill level of fuel tank 144) via a fuel level sensor. The level of fuel stored at fuel tank 144 (e.g., as identified by the fuel level sensor) may be communicated to vehicle operator 102, for example, via a fuel gauge or indication in a vehicle instrument panel 196. In additional or alternative examples, control system 190 may be coupled to external fuel pump 174 via wireless network 131 (e.g., in a "smart" fuel pump configuration). In such examples, control system 190 may receive (e.g., via wireless network 131) signals indicative of an amount of fuel dispensed, a rate of fueling (e.g., during the refueling event), a distance of the vehicle from external fuel pump 174, an amount of money or credit available to vehicle operator 102 with which to purchase fuel at external fuel pump 174, etc. Accordingly, an expected level of fuel (e.g., a level of fuel expected assuming undegraded fuel system components) may be determined by control system 190 based on the signal received from external fuel pump 174.

In some examples, vehicle instrument panel 196 may include a refueling button, which may be manually actuated or pressed by a vehicle operator to initiate refueling. For example, in response to the vehicle operator actuating the refueling button, fuel tank 144 in the vehicle may be depressurized so that refueling may be performed.

Vehicle propulsion system 101 may also include an ambient temperature/humidity sensor 198, and a roll stability control sensor, such as a lateral and/or longitudinal and/or yaw rate sensor(s) 199. As shown, sensors 198, 199 may be communicably coupled to control system 190, such that the control system may receive signals from the respective sensors. Vehicle instrument panel 196 may include indicator light(s) and/or a text-based display in which messages are displayed to vehicle operator 102 (e.g., such as an indication of a degradation status of a vehicle component generated by a diagnostic control routine). Vehicle instrument panel 196 may also include various input portions 197 for receiving an operator input, such as depressible buttons, touch screens, voice input/recognition, etc.

In some examples, vehicle propulsion system 101 may include one or more onboard cameras 135. Onboard camera(s) 135 may communicate photo and/or video imaging data to control system 190, for example. Onboard camera(s) 135 may in some examples be utilized to record images within a predetermined radius of the vehicle, for example. As such, control system 190 may employ signals (e.g., imaging data) received by onboard camera(s) 135 to detect and identify objects and locations external to the vehicle.

In additional or alternative examples, vehicle instrument panel 196 may communicate audio messages to vehicle operator 102 in combination with, or entirely without, visual display. Further, sensor(s) 199 may include a vertical accelerometer to indicate road roughness, the vertical accelerometer being communicably coupled to control system 190, for example. As such, control system 190 may adjust engine output and/or wheel brakes to increase vehicle stability in response to signals received from sensor(s) 199.

Control system 190 may be communicably coupled to other vehicles or infrastructures using appropriate communications technology. For example, control system 190 may be coupled to other vehicles or infrastructures via wireless network 131, which may comprise Wi-Fi, Bluetooth®, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. The communication and the information exchanged between vehicles may be either direct between vehicles, or multi-hop. In some examples, longer range communications (e.g., WiMax) may be used in place of, or in conjunction with, V2V or V2I2V to extend coverage area on an order of a few miles. In still other examples, control system 190 may be communicably coupled to other vehicles or infrastructures via wireless network 131 and the Internet (e.g., cloud). In further examples, wireless network 131 may be a plurality of wireless networks 131 across which data may be communicated to vehicle propulsion system 101.

Vehicle propulsion system 101 may also include an onboard navigation system 132 (for example, a global positioning system, or GPS) with which vehicle operator 102 may interact. Onboard navigation system 132 may include one or more location sensors for assisting in estimating vehicle speed, vehicle altitude, vehicle position/ location, etc. Such information may be used to infer engine operating parameters, such as local barometric pressure. As discussed above, control system 190 may be configured to receive information via the Internet or other communication networks. Accordingly, information received at control system 190 from onboard navigation system 132 may be cross-referenced to information available via the Internet to determine local weather conditions, local vehicle regulations, etc. In some examples, vehicle propulsion system 101 may include laser sensors (e.g., lidar sensors), radar sensors, sonar sensors, and/or acoustic sensors 133, which may enable vehicle location information, traffic information, etc., to be collected via the vehicle.

Referring now to FIG. 2, a schematic diagram 200 depicting a vehicle system 206 is shown. In some examples, vehicle system 206 may be an HEV system, such as a PHEV system. For example, vehicle system 206 may be the same as vehicle propulsion system 101 of FIG. 1. However, in other examples, vehicle system 206 may be implemented in a non-hybrid vehicle (e.g., a vehicle equipped with an engine and without a motor operable to at least partially propel the vehicle).

Vehicle system 206 may include an engine system 208 coupled to each of an evaporative emissions control system 251 and fuel system 140. Engine system 208 may include engine 110 having a plurality of cylinders 230. Engine 110 may include an engine air intake system 223 and an engine exhaust system 225. Engine air intake system 223 may include a throttle 262 in fluidic communication with an engine intake manifold 244 via an intake passage 242. Further, engine air intake system 223 may include an air box and filter (not shown) positioned upstream of throttle 262. Engine exhaust system 225 may include an exhaust manifold 248 leading to an exhaust passage 235 that routes exhaust gas to the atmosphere. Engine exhaust system 225 may include an emission control device 270, which in one example may be mounted in a close-coupled position in exhaust passage 235 (e.g., closer to engine 110 than an outlet of exhaust passage 235) and may include one or more exhaust catalysts. For instance, emission control device 270 may include one or more of a three-way catalyst, a lean nitrogen oxide (NOₓ) trap, a diesel particulate filter, an oxidation catalyst, etc. In some examples, an electric heater 282 may be coupled to emission control device 270, and utilized to heat emission control device 270 to or beyond a predetermined temperature (e.g., a light-off temperature of emission control device 270).

It will be appreciated that other components may be included in engine system 208 such as a variety of valves and sensors. For example, a barometric pressure sensor 213 may be included in engine air intake system 223. In one example, barometric pressure sensor 213 may be a manifold air pressure (MAP) sensor and may be coupled to engine intake manifold 244 downstream of throttle 262. Barometric pressure sensor 213 may rely on part throttle or full or wide open throttle conditions, e.g., when an opening amount of throttle 262 is greater than a threshold, in order to accurately determine a barometric pressure.

Fuel system 140 may include fuel tank 144 coupled to a fuel pump system 221. Fuel pump system 221 may include one or more pumps for pressurizing fuel delivered to cylinders 230 via fuel injectors 266 during a single cycle of cylinders 230 (while only a single fuel injector 266 is shown at FIG. 2, additional fuel injectors may be provided for each cylinder 230). A distribution or relative amounts of fuel delivered, injection timing, etc. may vary with operating conditions such as engine load, engine knock, exhaust temperature, etc. responsive to different operating or degradation states of fuel system 140, engine 110, etc.

Fuel system 140 may be a return-less fuel system, a return fuel system, or any one of various other types of fuel system. Fuel tank 144 may hold a fuel 224 including a plurality of fuel blends, e.g., fuel with a range of alcohol concentrations, such as gasoline, various gasoline-ethanol blends (including E10, E85), etc. A fuel level sensor 234 disposed in fuel tank 144 may provide an indication of the fuel level ("Fuel Level Input") to a controller 212 included in control system 190. As depicted, fuel level sensor 234 may include a float coupled to a variable resistor. Alternatively, other types of fuel level sensors may be used.

Vapors generated in fuel system 140 may be routed to evaporative emissions control system 251 via vapor recovery line 231, before being purged to engine air intake system 223. Vapor recovery line 231 may be coupled to fuel tank 144 via one or more conduits. For example, vapor recovery line 231 may be coupled to fuel tank 144 via at least one conduit 271.

Evaporative emissions control system 251 may further include one or more fuel vapor containers or EVAP canisters 222 for capturing and storing fuel vapors. EVAP canister 222 may be coupled to fuel tank 144 via at least one conduit 278 including at least one fuel tank isolation valve (FTIV) 252 for isolating the fuel tank during certain conditions. Fuel tank 144 may be sealed except for fuel tank isolation port 203 and the operation of FTIV 252. FTIV 252 may be operated in an open or a close position, depending on conditions described herein. For example, during engine operation, FTIV 252 may be kept closed to limit the amount of diurnal or "running loss" vapors directed to canister 222 from fuel tank 144. During refueling operations and selected purging conditions, FTIV 252 may be temporarily opened, e.g., for a duration, to direct fuel vapors from the fuel tank 144 to EVAP canister 222. FTIV 252 may also be temporarily opened when the fuel tank pressure is higher than a threshold (e.g., above a mechanical pressure limit of the fuel tank), such that fuel vapors may be released into EVAP canister 222 and the fuel tank pressure is maintained below the threshold. Further, FTIV 252 may be temporarily opened during a reverse purge of the canister such that ambient air is drawn through the canister and stored fuel vapors routed to the fuel tank 144 via port 203, an operation described in more detail below.

In some examples, vapor recovery line 231 may be coupled to a fuel tank refilling or refueling system 219. In some examples, refueling system 219 may include a fuel cap 205 for sealing off the refueling system from the atmosphere. Refueling system 219 may be coupled to fuel tank 144 via a neck or fuel filler pipe 211. In some examples, fuel filler pipe 211 may include a flow meter sensor 220 operable to monitor a flow of fuel being supplied to fuel tank 144 via the fuel filler pipe (e.g., during refueling).

During refueling, fuel cap 205 may be manually opened or may be automatically opened responsive to a refueling request received at controller 212. A fuel dispensing device (e.g., 170) may be received by, and thereafter fluidically coupled to, refueling system 219, whereby fuel may be supplied to fuel tank 144 via fuel filler pipe 211. Refueling may continue until the fuel dispensing device is manually shut off or until fuel tank 144 is filled to a threshold fuel level (e.g., until feedback from fuel level sensor 234 indicates the threshold fuel level has been reached), at which point a mechanical or otherwise automated stop of the fuel dispensing device may be triggered.

Evaporative emissions control system 251 may include one or more emissions control devices, such as EVAP canister 222 filled with an appropriate adsorbent, the canister being configured to temporarily trap fuel vapors (including vaporized hydrocarbons) during refueling operations. In one example, the adsorbent used may be activated charcoal. Evaporative emissions control system 251 may further include a canister ventilation path or vent line 227, which may route gases out of EVAP canister 222 to the atmosphere when storing, or trapping, fuel vapors from fuel system 140.

EVAP canister 222 may include a buffer 222a (or buffer region), each of the canister and the buffer including the adsorbent. As shown, a volume of buffer 222a may be smaller than (e.g., a fraction of) a volume of EVAP canister 222. The adsorbent in buffer 222a may be the same as, or different from, the adsorbent in EVAP canister 222 (e.g., both may include charcoal). Buffer 222a may be positioned within EVAP canister 222 such that, during canister loading, fuel tank vapors may first be adsorbed within the buffer, and then when the buffer is saturated, further fuel tank vapors may be adsorbed in a remaining volume of the EVAP canister. In comparison, during purging of EVAP canister 222, fuel vapors may first be desorbed from the EVAP canister (e.g., to a threshold amount) before being desorbed from buffer 222a. In other words, loading and unloading of buffer 222a may not be linear with loading and unloading of EVAP canister 222. As such, one effect of buffer 222a is to dampen any fuel vapor spikes flowing from fuel tank 144 to EVAP canister 222, thereby reducing a possibility of any fuel vapor spikes going to engine 110.

In some examples, one or more temperature sensors 232 may be coupled to and/or within EVAP canister 222. As fuel vapor is adsorbed by the adsorbent in EVAP canister 222, heat may be generated (heat of adsorption). Likewise, as fuel vapor is desorbed by the adsorbent in EVAP canister 222, heat may be consumed. In this way, the adsorption and desorption of fuel vapor by EVAP canister 222 may be monitored and estimated based on temperature changes within the canister. In one example, one or more oxygen sensors 215 may be coupled to and/or within the canister to monitor canister breakthrough and provide an estimate of a canister load to the controller 212.

Vent line 227 may also allow fresh air to be drawn into EVAP canister 222 when purging stored fuel vapors from fuel system 140 to engine air intake system 223 via purge line 228 and purge valve 261. For example, purge valve 261 may normally be closed but may be opened during certain conditions so that vacuum from engine intake manifold 244 may be provided to EVAP canister 222 for purging. In some examples, vent line 227 may further include an air filter 259 disposed therein downstream of EVAP canister 222.

Flow of air and vapors between EVAP canister 222 and the atmosphere may be regulated by a canister vent valve 229. Canister vent valve 229 may be a normally open valve, so that FTIV 252 may control venting of fuel tank 144 with the atmosphere. As described above, FTIV 252 may be positioned between fuel tank 144 and EVAP canister 222 within conduit 278. FTIV 252 may be a normally closed valve such that fuel tank 144 may be sealed under standard operating conditions. In some examples, FTIV 252 in an open position allows for venting of fuel vapors from fuel tank 144 to EVAP canister 222. Fuel vapors may then be vented to atmosphere via canister vent valve 229, or purged to engine air intake system 223 via canister purge valve 261. In other examples, such as during canister reverse purging, FTIV 252, when opened, allows for the venting of fuel vapors from the fuel canister 222 into the fuel tank 144.

In some examples, evaporative emissions control system 251 may further include an evaporative level check monitor (ELCM) 295. ELCM 295 may be disposed in vent line 227 and may be configured to control venting and/or assist in detection of undesired evaporative emissions. As an example, ELCM 295 may include a vacuum pump for applying negative pressure to the fuel system when administering a test for undesired evaporative emissions. In some embodiments, the vacuum pump may be configured to be reversible. In other words, the vacuum pump may be configured to apply either a negative pressure or a positive pressure on the evaporative emissions control system 251 and fuel system 140. ELCM 295 may further include a reference orifice (not shown), a pressure sensor (not shown), and a changeover valve (COV) 296. A reference check may thus be performed whereby a vacuum may be drawn across the reference orifice, where the resulting vacuum level comprises a vacuum level indicative of an absence of undesired evaporative emissions. For example, following the reference check, the fuel system 140 and evaporative emissions control system 251 may be evacuated by the ELCM vacuum pump. In the absence of undesired evaporative emissions, the vacuum may pull down to the reference check vacuum level. Alternatively, in the presence of undesired evaporative emissions, the vacuum may not pull down to the reference check vacuum level.

During select engine and/or vehicle operating conditions, such as after an emission control device light-off temperature has been attained (e.g., a threshold temperature reached after warming up from ambient temperature) and with the engine running, the controller 212 may control the ELCM 295 changeover valve (COV) 296 to enable EVAP canister 222 to be fluidically coupled to atmosphere. For example, ELCM COV 296 may be configured in a first position (e.g., opened), where the first position includes the EVAP canister 222 fluidically coupled to atmosphere, except during pressure tests performed on the system. In one example, ELCM COV 296 may configured to the first position (e.g., opened) when the fuel system may be operated in a canister reverse purging mode, described in more detail below. In an example, under natural aspiration conditions (e.g., intake manifold vacuum conditions), ELCM COV 296 may be configured in a second position (e.g., closed) to seal the EVAP canister 222 from atmosphere. By commanding ELCM COV 296 to the second position, the evaporative emissions control system 251 and fuel system 140 may be evacuated in order to ascertain the presence or absence of undesired evaporative emissions.

A hydrocarbon (HC) sensor 298 may be present in evaporative emissions control system 251 to indicate the concentration of hydrocarbons in vent line 227. As illustrated, hydrocarbon sensor 298 is positioned between EVAP canister 222 and air filter 259. A probe (e.g., sensing element) of hydrocarbon sensor 298 is exposed to and senses the hydrocarbon concentration of fluid flow in vent line 227. Hydrocarbon sensor 298 may be used by the control system 190 for determining breakthrough of hydrocarbon vapors from EVAP canister 222, in one example.

Fuel system 140 may be a non-integrated refueling canister-only system (NIRCOS), in that fuel tank 144 may be substantially isolatable from EVAP canister 222 such that fuel vapors in fuel tank 144 and EVAP canister 222 may be independently controlled as desired (e.g., during refueling). During periods in which fuel tank 144 is fluidically decoupled from EVAP canister 222, a fuel vapor pressure may develop within the fuel tank. Accordingly, venting and depressurization control routines are often implemented for NIRCOS fuel tanks, along with structural reinforcement thereof. For example, a given NIRCOS may include numerous valves and venting lines coupled to fuel tank(s) included therein to ensure that any excess fuel vapor pressure is properly evacuated or redistributed. Further, NIRCOS fuel tanks may be constructed of high tensile-strength material, such as heavy steel, and configured with a plurality of standoffs therein, the plurality of standoffs extending between opposing walls of a given NIRCOS fuel tank, such that greater fuel vapor pressures may be withstood without fuel tank degradation.

As an alternative, fuel system 140 may include a bellows 291 to maintain a fuel vapor pressure of fuel tank 144 at, or near, atmospheric pressure. As such, complex structural configurations for managing excess fuel vapor pressure may be obviated. Specifically, bellows 291 may be disposed within and coupled to an upper surface 145 of fuel tank 144 having an atmospheric port 293. Bellows 291 may be coupled to upper surface 145, e.g., a top, of the fuel tank relative to ground 207 on which the vehicle system travels.

As shown in FIG. 2, the fuel level of fuel 224 in fuel tank 144 may be entirely below bellows 291, such that the (liquid) fuel may not be physically contacting the bellows and the bellows may be in a maximally expanded configuration. As the bellows 291 is contacted by rising fuel 224 during refueling, the bellows may compress along an axis 292 proportionally with an increase in the fuel level in fuel tank 144 (up until the bellows reaches a maximally compressed configuration). During compression, air within bellows 291 may be evacuated via the atmospheric port 293. After refueling and during engine operation, fuel 224 may be provided to engine 110 via actuation of fuel pump system 221, such that the fuel level in fuel tank 144 may fall and bellows 291 may expand proportionally along axis 292 (up until the bellows again attains the maximally expanded configuration). During expansion, a pressure differential may be generated between bellows 291 and the surrounding environment such that air may be induced into the bellows via the atmospheric port 293.

In this way, a variable volume configuration may be provided to fuel tank 144 via expansion and contraction of bellows 291, such that a fuel vapor pressure of the fuel tank may be maintained within a threshold range of a predetermined pressure (e.g., an ambient pressure of the surrounding environment). In some examples, the fuel vapor pressure of fuel tank 144 may be maintained within the threshold range even across widely varying ambient temperatures, such as between 40 and 95° F. As such, fuel tank 144 may be formed from materials having relatively weaker strength and including fewer or no standoffs therein. Further, a more simplified configuration of valves and lines may be included in fuel system 140 relative to other NIRCOSs, as complex depressurization/venting routines may be obviated by the presence of bellows 291.

The atmospheric port 293 of bellows 291 may be routed to vent line 227 proximal to hydrocarbon sensor 298 of evaporative emissions control system 251 via vapor line 299. In one example, a valve, herein referred to as bellows valve 294, may be fluidly coupled with an internal volume of bellows 291 and an atmospheric port 293. As another example, bellows valve 294 may be positioned in a vent line downstream of atmospheric port 293. In one example, bellows valve 294 may be open during vehicle operation. In another example, the controller may operate bellows valve 294 responsive to operating conditions. For example, the controller may operate bellows valve 294 responsive to ambient temperature variations and/or to selectively maintain a fixed volume in bellows 291. In the illustrated example, a first end of vapor line 299 is attached to atmospheric port 293 of bellows 291 and a second end of vapor line 299 is attached to hydrocarbon sensor 298 in vent line 227. The controller may open bellows valve 294, establishing fluid communication between bellows 291 of fuel tank 144 and hydrocarbon sensor 298. Thus, the system enables fuel vapors escaping from bellows 291 (e.g., due to degradation/leak in the bellows) via vapor line 299 to be detected by hydrocarbon sensor 298 of evaporative emissions control system 251.

Therefore, hydrocarbon sensor 298 of evaporative emissions control system 251 may perform multiple different functions. Hydrocarbon sensor 298 may detect fuel vapors escaping from EVAP canister 222 to atmosphere, if there is a leak or degradation in the canister. In addition, hydrocarbon sensor 298 may also detect fuel vapors escaping from bellows 291 of fuel tank 144 via atmospheric port 293, if there is a leak or degradation in the bellows.

Fuel system 140 may be operated by controller 212 in a plurality of modes by selective adjustment of the various valves (e.g., responsive to the various sensors). For example, fuel system 140 may be operated in a refueling mode (e.g., when refueling is requested by a vehicle operator), wherein controller 212 may close FTIV 252, allowing bellows 291 to maintain the fuel vapor pressure of fuel tank 144 within the threshold range of the predetermined pressure. However, if bellows 291 is compressed to the maximally compressed configuration, and the fuel vapor pressure begins increasing beyond that is manageable by fuel tank 144 (e.g., when the fuel tank becomes undesirably overfilled), fuel system 140 may be operated in a venting mode. In the venting mode, controller 212 may open FTIV 252 and canister vent valve 229, while maintaining canister purge valve 261 closed, to direct refueling vapors into EVAP canister 222 while preventing fuel vapors from being directed into engine intake manifold 244 (and thus provide a venting path for fuel vapors). As such, opening FTIV 252 may allow refueling vapors to be stored in EVAP canister 222. After refueling is completed, at least FTIV 252 may be closed once again.

As another example, the fuel system may be operated in a canister purging mode (e.g., after a given emission control device light-off temperature has been attained and with engine 110 running), wherein controller 212 may open canister purge valve 261 and canister vent valve 229 while closing FTIV 252. Herein, the vacuum generated by engine intake manifold 244 of (operating) engine 110 may be used to draw fresh air through vent line 227 and through EVAP canister 222 to purge stored fuel vapors into engine intake manifold 244. As such, in the canister purging mode, the purged fuel vapors from EVAP canister 222 may be combusted in engine 110. The canister purging mode may be continued until an amount or level of stored fuel vapors in EVAP canister 222 are below a threshold amount or level.

As another example, the fuel system may be operated in a canister reverse purging mode, (e.g., during a cool down period of a diurnal cycle), wherein controller 212 may open FTIV 252 while closing bellows valve 294. Herein, closing the bellows valve 294 reduces the contraction and expansion of the bellows 291, enabling a vacuum to generate within airgap 201 of the fuel tank 224 as the ambient temperature falls and the fuel 224 in the tank condenses. The vacuum generated by the fuel tank 144 draws fresh air through vent line 227 and through EVAP canister 222. The fresh air purges stored fuel vapors from canister via conduit 278 into the fuel tank 224. As such, in the canister reverse purging mode, purged fuel vapors from EVAP canister 222 may be accumulated in the reservoir of fuel 224. As one example, the canister reverse purging mode may be operated in select vehicle off conditions and in response to an ambient temperature reducing during a diurnal temperature cycle, e.g., night. In another example, the canister reverse purging mode may be operated in response to a loading of the EVAP canister with vapors above a threshold. In an example, the canister reverse purging mode may operate until one or more threshold conditions are met initiating a restoration of a default mode, e.g., bellows valve 294 opened and FTIV 252 closed. In one example, a default mode restoring condition may include a vehicle on condition. In another example, a default mode restoring condition may be a time of a day indicating an ambient temperature increase during the diurnal cycle, e.g., day.

Control system 190, including controller 212, is shown receiving information from a plurality of sensors 216 (various examples of which are described herein) and sending control signals to a plurality of actuators 281 (various examples of which are described herein). As one example, sensors 216 may include one or more of exhaust gas sensor 237 located upstream of emission control device 270 in exhaust passage 235, temperature sensor 233 located downstream of emission control device 270 in exhaust passage 235, flow meter sensor 220 located in fuel filler pipe 211, fuel level sensor 234 located in fuel tank 144, temperature sensor 232 and oxygen sensor 215 located in EVAP canister 222, and hydrocarbon sensor 298 located in vent line 227. Other sensors such as pressure, temperature, air/fuel ratio, and composition sensors may be coupled to various locations in vehicle system 206 (for example, a fuel tank pressure sensor 297 may further be included in fuel tank 144). As an additional or alternative example, actuators 281 may include fuel injector 266, throttle 262, FTIV 252, bellows valve 294, canister purge valve 261, canister vent valve 229, and ELCM COV 296. Controller 212 may receive input data from sensors 216, process the input data, and trigger actuators 281 in response to the processed input data based on instructions or code programmed in non-transitory memory therein, the instructions or code corresponding to one or more control routines. For example, during a vehicle off condition or during a refueling event, control system 190 may be configured to monitor a fuel level of fuel tank 144 and the amount of fuel supplied to the fuel tank. As another example, during canister reverse purge conditions control system 190 may be configured to carry out valve control operations including closing bellows valve 294 and opening the FTIV 252.

A control routine for reverse purging an EVAP canister of a vehicle including a sealed variable volume fuel tank, such as vehicle system 206, is described in detail below with reference to FIG. 3. In the present disclosure, the vehicle system may operate in a first mode, e.g., a default mode, where a bellows of the fuel tank may vary in volume maintaining the fuel tank at atmospheric pressure. Alternatively, the vehicle system may operate in a second mode, e.g., a canister reverse purging mode, where the bellows volume may remain fixed or nearly fixed facilitating vacuum pressure inside the fuel tank to build. A timing diagram illustrating an example prophetic operation of the control routine to adjust components of vehicle system 206 to default mode settings or canister reverse purging settings is described in detail below with reference to FIG. 4.

Figure 3:
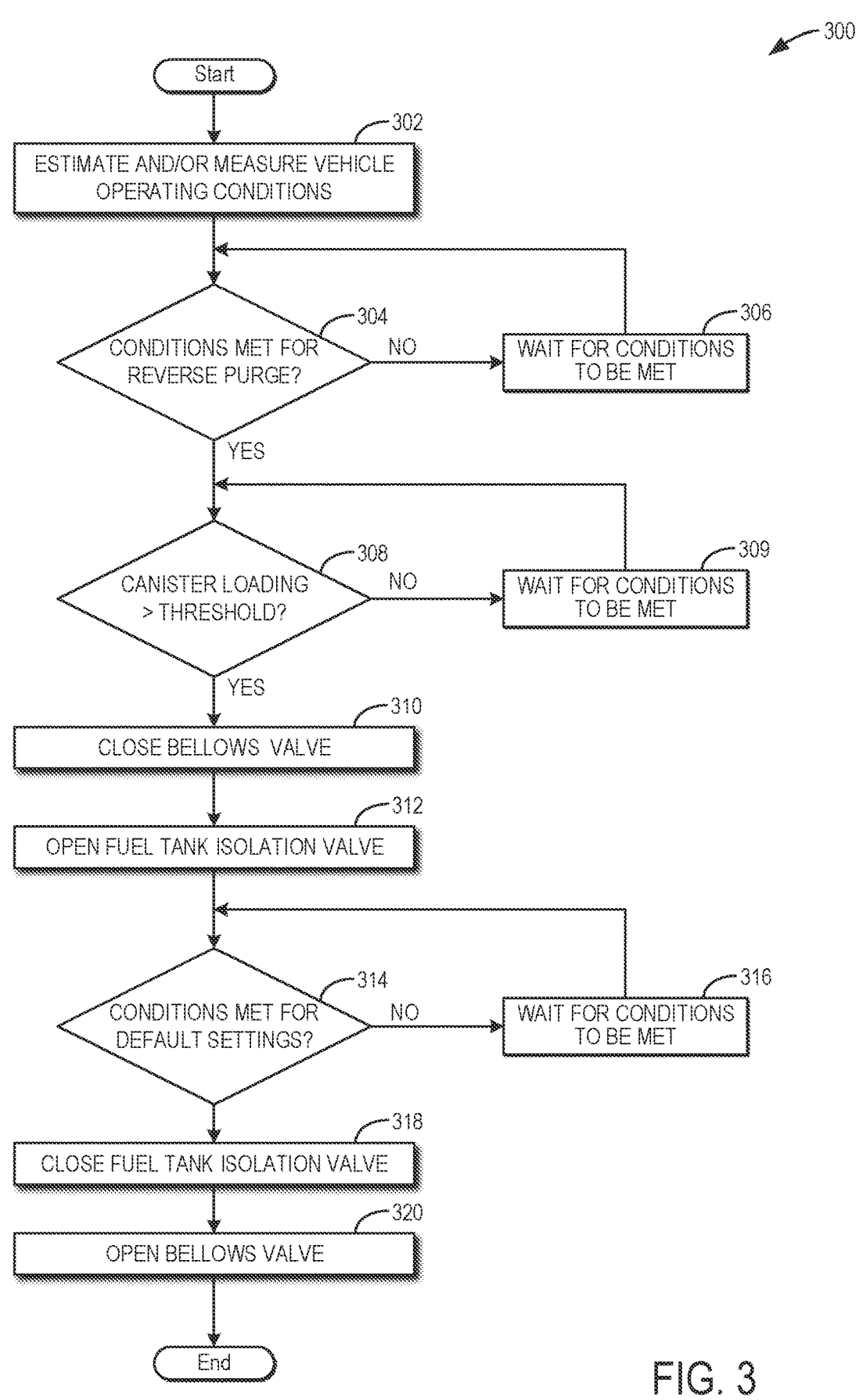
FIG. 3 shows a high-level flow chart of an example method for performing a reverse purge of an evaporative emissions canister in a vehicle with a sealed variable volume fuel tank, such as vehicle 206 of FIG. 2.

Referring now to FIG. 3, an example method 300 is shown for reverse purging an EVAP canister of a vehicle system including a sealed variable volume fuel tank, such as the vehicle system described above with reference to FIGS. 1 and 2. Instructions for carrying out method 300 may be executed by a controller (e.g., controller 212) with instructions stored on a computer readable memory of the controller and in conjunction with signals received from sensors of the vehicle system, such as the sensors described above with reference to FIGS. 1 and 2. Further, the controller may employ actuators (e.g., 281) of the vehicle system to adjust operation of the fuel system 140 and the evaporative emissions control system 251, e.g., responsive to a determination of reverse purge conditions, according to the method 300 as described below.

At 302, the method includes estimating and/or measuring vehicle operating conditions. In one example, the controller (e.g., controller 212) acquires measurements from various sensors in the engine system and estimates operating conditions such an engine off/on condition, time of day, ambient temperature, and the load of the EVAP canister. In one example, the controller receives signals indicating predicted weather conditions, e.g., temperature forecast. As an example, the controller may receive predicted weather in communication with a weather service, e.g., via V2I communication, via GPS unit in the vehicle, etc. In one example, the temperature forecast includes a cool range of temperatures (e.g., 5° C. to 10° C.) between the hours of 6 PM and 7 AM. In one example, the controller may determine one or more thresholds based on ambient temperature variations of the temperature forecast. In one example, the load of a canister (e.g., canister 222) is an amount of fuel vapor stored in the canister. In one example, the canister load may be estimated based on a first time elapsed since an immediately previous purge event wherein fuel vapor from the canister was routed to the engine for combustion. In one example, the canister load may be estimated based on a first time elapsed since an immediately previous reverse purge event wherein fuel vapor from the canister was routed to the fuel tank for condensation. The canister load is further estimated based on a duration of opening of the FTIV (e.g., FTIV 252) such as during a refueling event following the immediately previous purge event to allow flow of fuel vapor from the fuel tank to the canister thereby increasing canister load. In another example, during purging, an estimated vapor amount/concentration can be used to determine the amount of fuel vapors stored in the canister, and then during a later portion of the purging operation (when the canister is sufficiently purged or empty), the estimated vapor amount/concentration can be used to estimate a loading state of the EVAP canister. In yet another example, canister load may be estimated based on outputs of one or more oxygen sensors coupled to the canister (e.g., downstream of the canister), or positioned in the engine intake and/or engine exhaust, to provide an estimate of a canister load. The controller may further detect states of the valves and measure fuel tank pressure with a pressure sensor.

At 304, the method includes determining if conditions are met for canister reverse purging. As an example, the conditions for canister reverse purging may include an engine off condition. As an example, the conditions may include a time of day greater (e.g., later) than a first threshold time and lesser (e.g., earlier) than a second threshold time, such as a time of day between 6 PM and 7 AM. In an example, the first and second threshold time may be based on the temperature forecast indicating ambient temperature reducing during the diurnal temperature cycle, e.g., the cooler temperature hours of the diurnal cycle. If the conditions for reverse purge are not met, method 300 proceeds to 306, where the method includes waiting for conditions to be met. If the conditions for reverse purge are not met, the vehicle system may be in a default mode of operation, wherein default settings include bellows valve open and FTIV closed.

If it is determined at 304 that conditions for reverse purge are met, the method moves on to 308. At 308, the method includes determining whether the canister load is higher than a threshold load. The threshold load may be empty or nearly empty (e.g., 0-10% of the load capacity of the canister). If it is determined at 308 that the canister load is lower than the threshold load (e.g., the canister is empty or nearly empty), the method 300 moves on to 309. At 309, the method waits for the conditions to be met. For example, the method may wait for an empty canister to be loaded prior to initiating reverse purge of the canister load. Method 300 may then return to 308. If it is determined at 308 that the canister load is higher than the threshold load (e.g., not empty canister), the method 300 proceeds to 310.

At 310, the method includes closing the bellows valve (e.g., bellows valve 294 of FIG. 2) of the fuel tank (e.g., fuel tank 144 of FIGS. 1-2). As an example, a default mode of the fuel tank may include an open bellows valve. An open bellows valve allows the bellows to expand and contract to maintain fuel tank pressure at atmospheric pressure. Closing the bellows valve reduces the expansion and contraction of the bellows, impeding volume changes. In one example, impeding volume changes within the bellows converts the sealed variable volume fuel tank to a fixed volume fuel tank. With the tank volume fixed, a vacuum may generate inside the fuel tank as the fuel vapors cool and condense. In some examples, closing the bellows valve may include sending a command to move the bellows valve to a fully closed position, thereby sealing the internal volume of the bellows from atmosphere.

At 312, the method includes opening the fuel tank isolation valve (e.g., FTIV 252 of FIG. 2) of the evaporative emissions control system. As an example, a default mode of the evaporative emissions control system may include the FTIV being held in a closed position. As an example, during engine operation, the FTIV may be kept closed to limit the amount of diurnal or "running loss" vapors. Opening the FTIV allows the vacuum generated inside the fuel tank to pull fuel vapors from the canister into the fuel tank where the fuel vapors may cool and condense. The canister reverse purging mode (e.g., FTIV open and bellows valve closed) transforms the sealed variable volume fuel tank into a vented fixed volume, e.g., pressurized, fuel tank during the cooler hours of the diurnal temperature cycle. During the cooldown hours, fresh air is drawn into the canister, reverse purging the canister and reducing the likelihood of hydrocarbons reaching atmosphere. In one example, the vehicle is in an engine off condition during the cooler temperature hours of the diurnal cycle and the canister load is higher than the threshold load. In response to the conditions having been met, the bellows valve is closed and the FTIV is opened.

At 314, the method includes determining whether conditions are met to restore default settings. As an example, the conditions to restore default settings may include a vehicle on condition. As another example, the conditions to restore default settings may include a time of day outside of the cooler hours of the diurnal temperature cycle based on a weather forecast, e.g., a time of day later than 7 AM and before 6 PM. As a further example, the conditions to restore default settings may include an ambient temperature greater than a threshold temperature. If the conditions to restore the default settings are not met, method 300 proceeds to 316, where the method includes waiting for the conditions to be met.

If it is determined at 314 that the conditions are met for default settings, the method 300 proceeds to 318. At 318, the method includes closing the FTIV of the evaporative emissions control system. At 320, the method includes opening the bellows valve of the fuel tank. Opening the bellows valve restores the ability for the bellows to expand and contract to maintain fuel tank pressure at atmospheric pressure. Restoring the movement of the bellows converts the fixed volume fuel tank to a variable volume fuel tank. In an example, closing the FTIV prior to opening the bellows valve may reduce a backflow of fuel vapor as the vacuum diminishes inside the fuel tank upon restoring variable volume. As an example, the vehicle is in an engine off condition during the warmer temperature hours of the diurnal cycle. In response to the conditions to restore default settings having been met, the bellows valve is closed and the FTIV is opened.

From 320 the method 300 ends.

Figure 4:
FIG. 4 shows a timing diagram for example prophetic operation of a reverse purging routine for an EVAP canister in a vehicle with a sealed variable volume fuel tank, such as vehicle 206 of FIG. 2.
Figure 4:

Turning now to FIG. 4, a timing diagram 400 is shown that illustrates a sequence of actions performed within a control routine for reverse purging an EVAP canister in a vehicle system including a sealed variable volume fuel tank. The control routine may be the same as or similar to the series of actions described above in reference to the method 300 in FIG. 3. The EVAP canister of the vehicle may be the same as or similar to the canister 222 of the evaporative emissions control system 251 of vehicle system 206. The variable volume fuel tank may be the same or similar as the fuel tank 144 of the fuel system 140 of FIG. 2. Instructions for performing the valve control actions described in the timing diagram 400 of FIG. 4 may be executed by a controller (e.g., the controller 212 of control system 190 of FIG. 2) based on instructions stored on a memory of the controller and in conjunction with signals received from sensors of the vehicle system, such as the sensors 216 of the vehicle system 206 described above with reference to FIGS. 1 and 2. The horizontal (x-axis) denotes time and the vertical markers t0-t4 identify relevant times in the method 300 of FIG. 3 to reverse purge the EVAP canister.

Timing diagram 400 shows plots 402, 404, 406, 408, 410, 412, and 414, which illustrate states of components and/or operating conditions of the vehicle system over time. Plot 402 indicates a status of an engine of the vehicle system (e.g., the engine 110 of the vehicle system 206 of FIG. 2), which may be in an ON state or an OFF state. Plot 404 indicates a time of day, which may be DAY or NIGHT. Time of day may be considered a threshold such that a time of day greater (e.g., later) than a first threshold time and lesser (e.g., earlier) than a second threshold time, such as a time of day between 6 PM and 7 AM, is equivalent to NIGHT and a time of day falling outside the first and second thresholds is equivalent to DAY. In one example, the controller may determine the first and second thresholds based on a temperature forecast predicting a cooling period of the diurnal cycle. Plot 406 indicates an ambient temperature. Plot 408 indicates a canister load. The dotted line in plot 408 represents a threshold canister load 409, which may be defined as a minimum fuel vapor storage in the EVAP canister. When the canister load is below the threshold canister load 409, the EVAP canister is empty of fuel vapors. Plot 410 indicates a state of a bellows valve (e.g., the bellows valve 294 of the fuel tank 144 of FIG. 2), which may be in an OPEN position or a CLOSED position. Plot 412 indicates a state of a fuel tank isolation valve (e.g., the FTIV 252 of the fuel tank 144 of FIG. 2), which may be in an OPEN position or a CLOSED position. Plot 414 indicates an air flow direction response corresponding to a vacuum generated in the fuel tank drawing air flow to the tank (TO TANK) or the air flow direction response corresponding to the absence of a vacuum and fuel tank pressure at or near atmospheric pressure (TO ATM [atmosphere]). The plots 404 and 406 show an increase upwards along the y-axis.

Plots 402, 404, 406, 408, 410, 412, and 414 illustrate states of the above mentioned components and/or operating conditions of the vehicle system across four durations: a first duration from time t0 to time t1; a second duration from time t0 to time t2; a third duration from time t2 to time t3; and a fourth duration from time t3 to time t4.

At time t0, the vehicle is in a drive condition such that the engine status is in an ON state at plot 402. The time of day at plot 404 is DAY. The ambient temperature is warmer. The canister load is higher and substantially above the threshold canister load 409. The direction of air flow in the fuel tank is TO ATM. In one example, the vehicle is being driven with engine ON at time t0. Since the conditions for the reverse purge of the evaporative emissions control system are not met at time t0, the bellows valve is in an OPEN position at plot 410, and the FTIV is in a CLOSED position.

Over the first duration from t0 to t1, plot 402 for engine status and plot 404 for time of day remain unchanged. Plot 406 for ambient temperature declines. Plot 408 for canister load varies little over the duration as intermittent purging take place while the vehicle is in a drive condition (e.g., engine status ON). Plot 414 for air flow direction varies little as atmospheric pressure is maintained in the fuel tank. Since the conditions for reverse purging mode of the evaporative emissions control system are not met at time from t0 to t1, the bellows valve is in an OPEN position at plot 410, and the FTIV is in a CLOSED position.

At time t1, due the vehicle no longer in a drive condition, the vehicle engine status is OFF at plot 402. The time of day is NIGHT at plot 404. Thus, the conditions for reverse purging mode are met at time t1. The canister load is higher and substantially above the threshold canister load 409. Thus, at time t1, actions are performed to put the evaporative emissions control system in reverse purging mode with the bellows valve is in the CLOSED position at plot 410 and the FTIV in the OPEN position at plot 412. The ambient temperature is cooler at plot 406.

From t1 to t2, fuel vapor cools and condenses in the fuel tank generating a vacuum indicated in plot 414 as air flow is in the TO TANK direction. The vacuum generated in the fuel tank reverse purges the canister, as indicated by the canister load reducing from t1 to t2 in plot 408. In one example, the controller may maintain reverse purging mode until one or more default mode conditions are met to resume the default mode. In one example, a default mode condition may include a time of day equivalent to a warming period of diurnal cycle, herein referred to as DAY. As another example, a default mode condition may include a time of day later than the second threshold, e.g., after 7 AM, and before than the first threshold, e.g., before 6 PM, based on predicted weather conditions indicating ambient temperature, e.g., greater than 15° C. In another example, a default mode condition may include an engine ON status, such that if an engine is turned on while the evaporative emissions control system is in reverse purging mode, default settings are restored.

At time t2, due to the vehicle being operated in a drive condition, the vehicle engine status resumes an ON state at plot 402. One of the one or more conditions to resume default mode are met. Thus, at time t2, the FTIV is in the CLOSED position at plot 412 and the bellows valve is in the OPEN position at plot 410.

Over the duration from t2 to t3, default mode is restored. Default mode enables the bellows to expand and/or contract to bring fuel tank pressure to atmosphere, as indicated in plot 414 by the direction of air flow TO ATM. Canister load increases as 'running loss' and/or depressurization fuel vapors are stored in the canister while the vehicle is in a driving condition.

At time t3, due the vehicle no longer operating in a drive condition, the vehicle engine status is OFF at plot 402. The time of day is NIGHT at plot 404. Thus, the conditions for reverse purging mode are once again met at time t3. The canister load is higher and substantially above the threshold canister load 409. Thus, at time t3, actions are once again performed to put the vehicle in reverse purging mode with the bellows valve in the CLOSED position at plot 410 and the FTIV in the OPEN position at plot 412. The ambient temperature is remains cooler at plot 406.

From t3 to t4, fuel vapor cools and condenses in the fuel tank once again generating a vacuum indicated in plot 414 as air flow in the TO TANK direction. The vacuum generated in the fuel tank reverse purges the canister, as indicated by the canister load reducing from t3 to t4 in plot 408.

At t4, the time of day is DAY at plot 404. Therefore, one of the one or more conditions to resume default mode are met. Thus, at time t4, the FTIV is in the CLOSED position at plot 412 and the bellows valve is in the OPEN position at plot 410.

In this way, systems and methods are provided for performing a reverse purge of an EVAP canister in a vehicle with a sealed variable volume fuel tank. In one example, a method may comprise in response to an ambient temperature reducing during a diurnal temperature cycle, and further in response to the EVAP canister loaded with fuel vapors above a threshold, closing a valve positioned at an atmospheric port of the fuel tank and opening a fuel tank isolation valve. In one example, the fuel tank isolation valve may be in fluid communication between the fuel tank and the EVAP canister. In a further example, the valve positioned at the atmospheric port of the fuel tank may be coupled between a bellows in the sealed variable volume fuel tank and the atmospheric port. By operating the valve and the fuel tank isolation valve in this way, it is possible to convert a sealed variable volume fuel tank to a vented fixed volume fuel tank and initiate a reverse purge during the cooldown hours of the diurnal temperature cycle. A technical effect of systems and methods described herein is that an advantageous phenomenon of a fixed volume fuel tank, e.g., reverse purging, may be adapted to a variable volume tank, thus facilitating a transition from fixed volume NIRCOS fuel tank systems to variable volume fuel tank systems.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method to perform a reverse purge of an evaporative emissions canister in a vehicle with a sealed variable volume fuel tank with bellows, comprising:
   detecting an ambient temperature is reducing during a diurnal temperature cycle, and further detecting a loading of the evaporative emissions canister with vapors is above a threshold while the ambient temperature is reduced, and
   in response to detecting the ambient temperature reducing during the diurnal temperature cycle, and further detecting the loading of the evaporative emissions canister with vapors is above the threshold while the ambient temperature is reducing, closing a valve fluidly coupled with an atmospheric port of the sealed variable volume fuel tank to reduce contraction and expansion of the bellows,
   wherein the closing of the valve is during a vehicle off condition, wherein the reverse purge draws air in from the atmosphere, then through the evaporative emissions canister, and then through a fuel tank isolation valve and into the fuel tank exterior to the bellows, and wherein during operation with the valve open, the bellows communicate fluidically with the atmosphere.

2. The method of claim 1, wherein the valve is coupled between an internal volume of the bellows in the sealed variable volume fuel tank and the atmospheric port, and wherein a canister vent valve is positioned between the evaporative emissions canister and atmosphere, the method further comprising opening the fuel tank isolation valve, the fuel tank isolation valve being in fluid communication between the sealed variable volume fuel tank and the evaporative emissions canister.

3. The method of claim 2, wherein the canister has only three fluidic communications, including communication to an engine intake through a purge valve, communication to the fuel tank and associated fuel filler neck and vapor recovery line through the fuel tank isolation valve, and to the atmospheric through the canister vent valve.

4. The method of claim 3, wherein the bellows are coupled to a top of the sealed variable volume fuel tank relative to ground on which the vehicle travels.

5. The method of claim 1, wherein the ambient temperature reducing during the diurnal temperature cycle is detected based on predicted weather conditions.

6. The method of claim 1, wherein the valve is coupled between an internal volume of bellows in the sealed variable volume fuel tank and the atmosphere.

7. The method of claim 1, further comprising opening the valve during vehicle operation.

8. The method of claim 7, further comprising purging the evaporative emissions canister during engine operation by opening the fuel tank isolation valve.

9. A vehicle system, comprising:
   a variable volume fuel tank, an air gap of the fuel tank sealed except for only a fuel tank isolation valve port and a fuel filler pipe, the fuel tank further comprising:
      bellows;
      a port coupling an internal volume of the bellows to atmosphere; and
      a valve positioned between an atmospheric port and atmosphere;
   an evaporative emissions canister;
   a fuel tank isolation valve in fluid communication between the fuel tank and the evaporative emissions canister; and
   a controller, the controller comprising computer readable memory with instructions stored therein configured to:
      in response to an ambient temperature reducing during a diurnal temperature cycle while a loading of the evaporative emissions canister with vapors is above a threshold, close the valve to reduce contraction and expansion of the bellows.

10. The vehicle system of claim 9, wherein the bellows are coupled to a top of the fuel tank relative to ground on which the vehicle system travels, and wherein fuel vapors in the fuel tank are sealed from the internal volume of the bellows.

11. The vehicle system of claim 10, further comprising a canister vent valve coupled between the canister and atmosphere, wherein the internal volume of the bellows fluidically communicates only through the valve.

12. The vehicle system of claim 10, further comprising an evaporative level check monitor (ELCM) disposed in a vent line of the canister.

13. The vehicle system of claim 9, wherein the instructions are further configured to carry out valve control during vehicle off conditions.

14. The vehicle system of claim 9, wherein the instructions are further configured to close the fuel tank isolation valve while opening the valve.

15. A vehicle system, comprising:
   a variable volume fuel tank, an air gap of the tank sealed except for only a fuel tank isolation valve port, the fuel tank further comprising:

bellows;

an atmospheric port coupling an internal volume of the bellows to atmosphere; and a valve positioned between the atmospheric port and atmosphere;

an evaporative emissions canister;

a fuel tank isolation valve in fluid communication between the fuel tank and the evaporative emissions canister; and a computer readable memory with instructions stored therein configured to carry out valve control during vehicle off conditions, including closing the valve and opening the fuel tank isolation valve during select vehicle off conditions based on ambient temperature variations and during a vehicle off condition, wherein the instructions are further configured to close the valve in response to the ambient temperature reducing during a diurnal temperature cycle while a loading of the canister with vapors is above a threshold.

16. The vehicle system of claim 15, wherein the bellows are coupled to a top of the fuel tank relative to ground on which the vehicle system travels, the system further comprising a canister vent valve coupled between the canister and atmosphere and an evaporative level check monitor (ELCM) disposed in a vent line of the canister.

* * * * *